Figure 2:
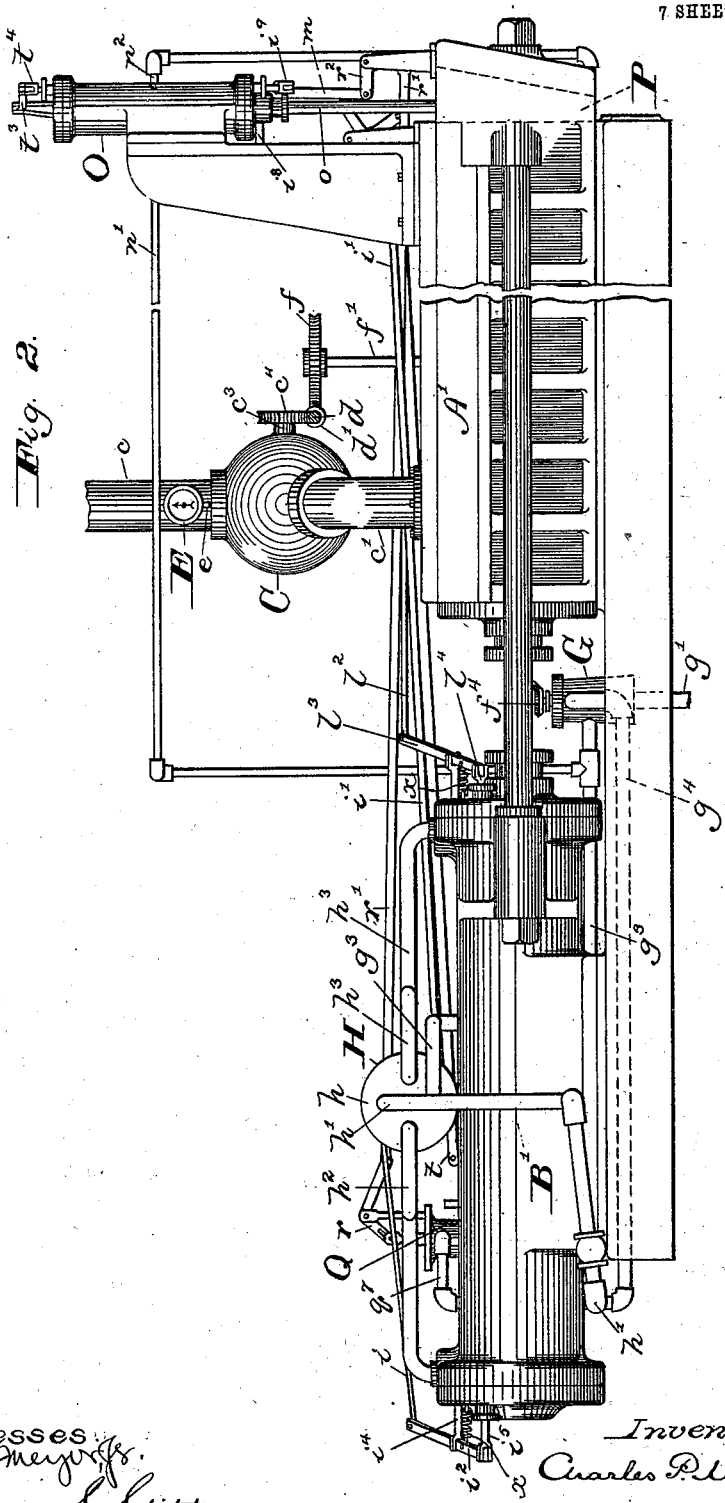

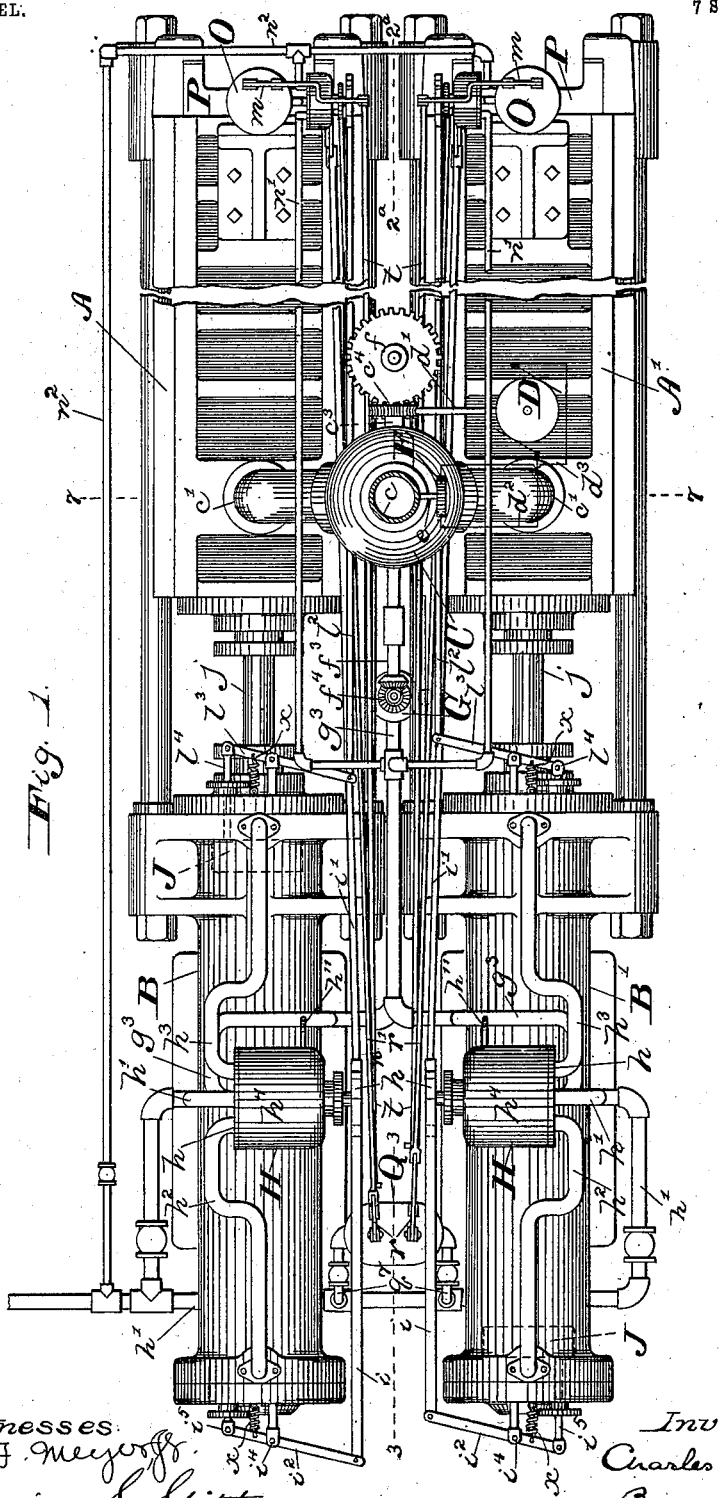

No. 723,702. PATENTED MAR. 24, 1903.
C. P. MINNING.
REGEALED ICE MACHINE.
APPLICATION FILED JULY 2, 1902.
NO MODEL. 7 SHEETS—SHEET 2.
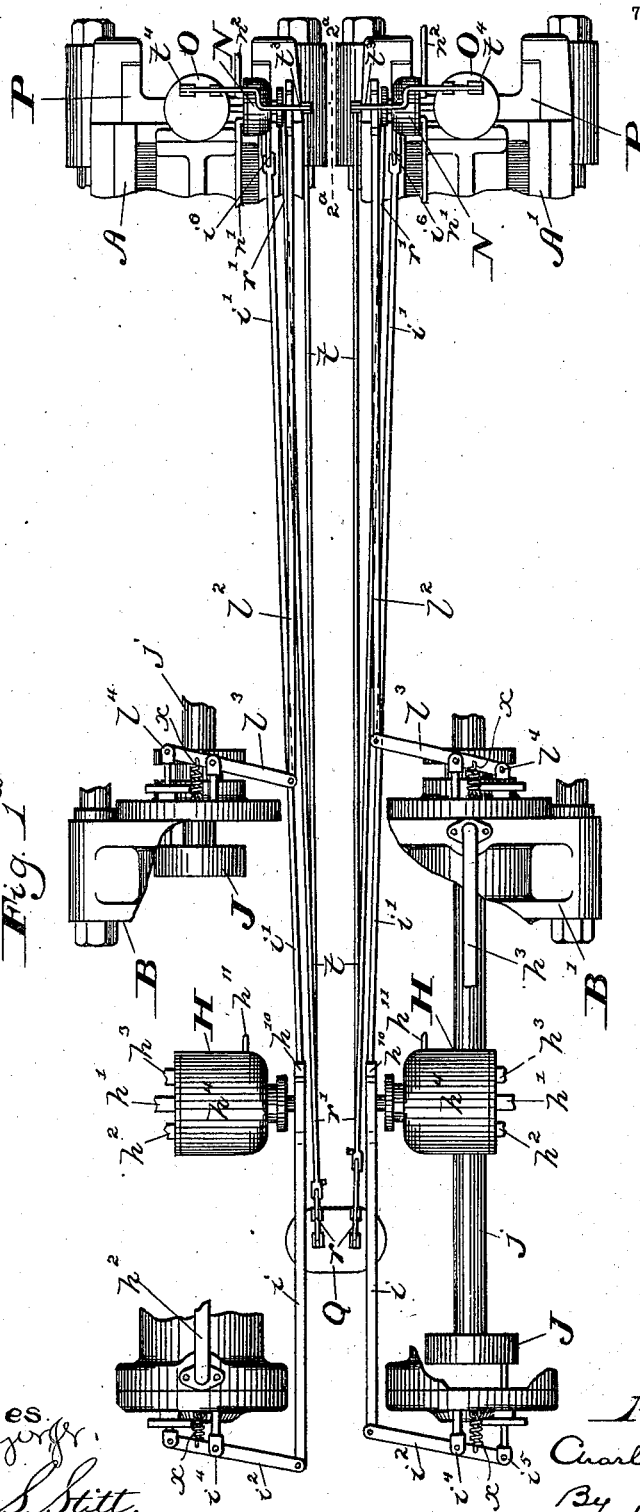
Witnesses
Inventor
Charles P. Minning
By Mann & Co.
Attorneys.

No. 723,702. PATENTED MAR. 24, 1903.
C. P. MINNING.
REGEALED ICE MACHINE.
APPLICATION FILED JULY 2, 1902.
NO MODEL. 7 SHEETS—SHEET 3.

Witnesses
Inventor
Charles P. Minning
By Mann & Co.
Attorneys

No. 723,702. PATENTED MAR. 24, 1903.
C. P. MINNING.
REGEALED ICE MACHINE.
APPLICATION FILED JULY 2, 1902.
NO MODEL. 7 SHEETS—SHEET 4.
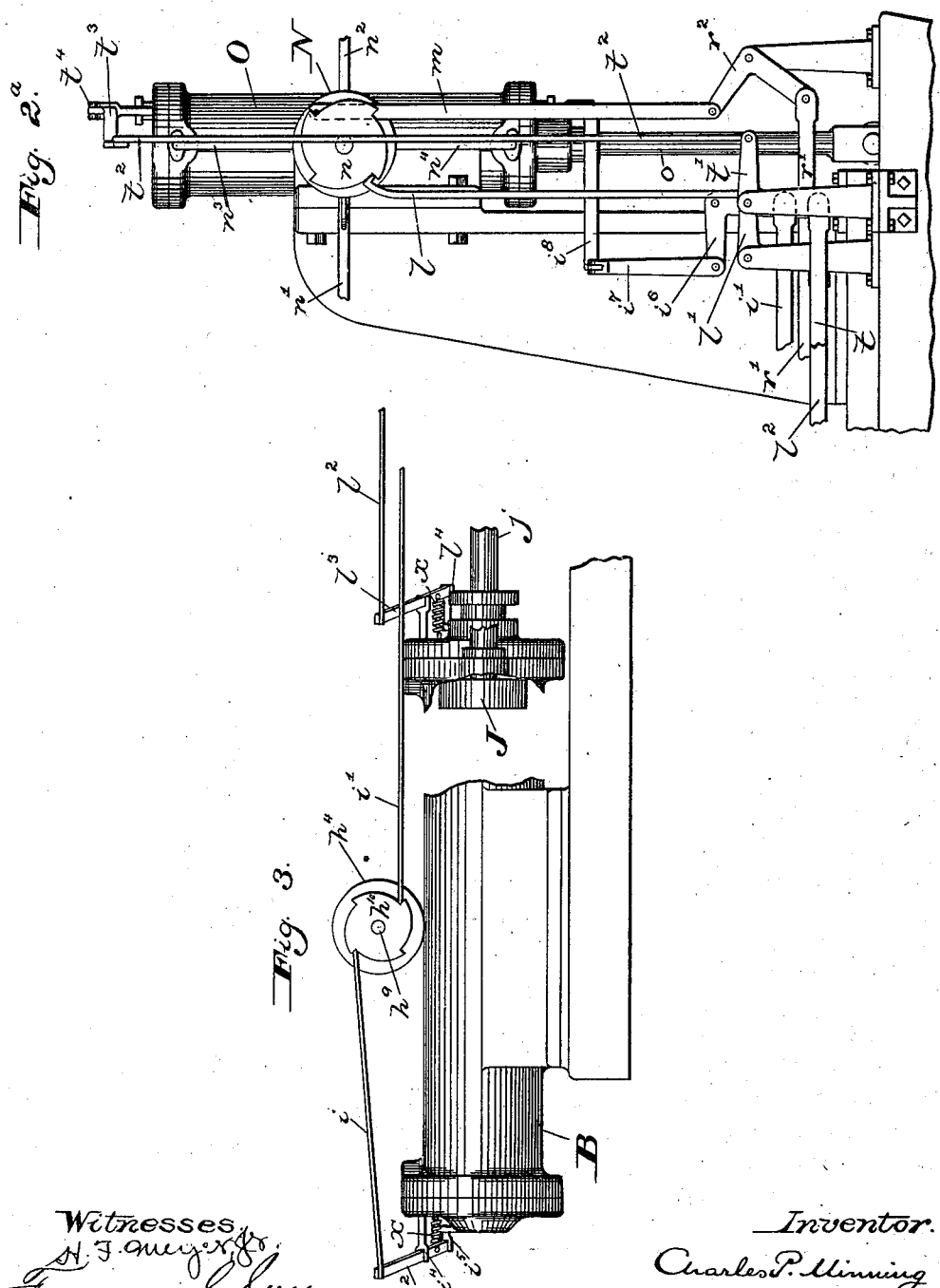

No. 723,702. PATENTED MAR. 24, 1903.
C. P. MINNING.
REGEALED ICE MACHINE.
APPLICATION FILED JULY 2, 1902.
NO MODEL. 7 SHEETS—SHEET 5.
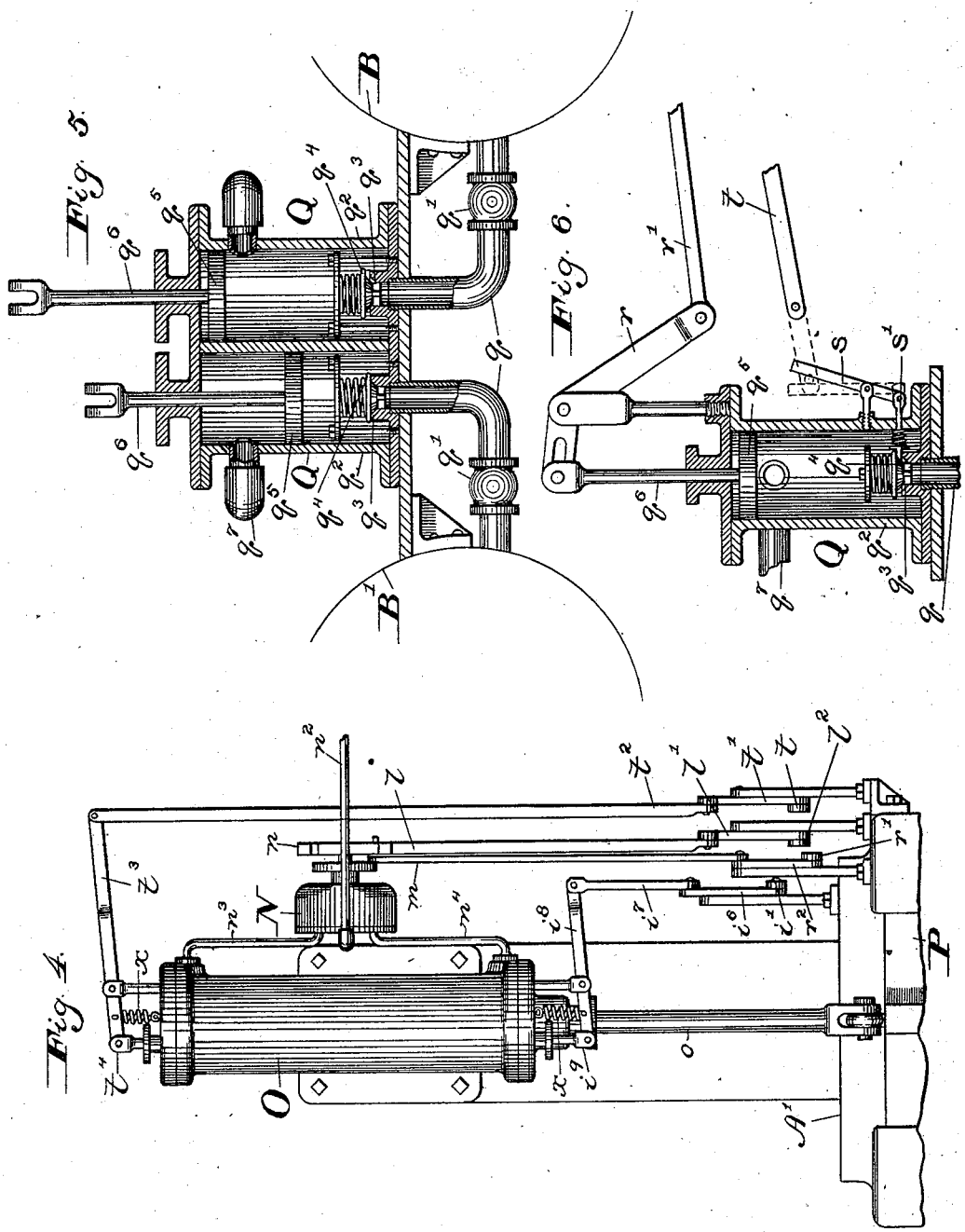
Witnesses
H. F. Meyer Jr.
Frederick S. Stitt.
Inventor
Charles P. Minning
By Mann & Co.
Attorneys.

No. 723,702. PATENTED MAR. 24, 1903.
C. P. MINNING.
REGEALED ICE MACHINE.
APPLICATION FILED JULY 2, 1902.
NO MODEL. 7 SHEETS—SHEET 6.
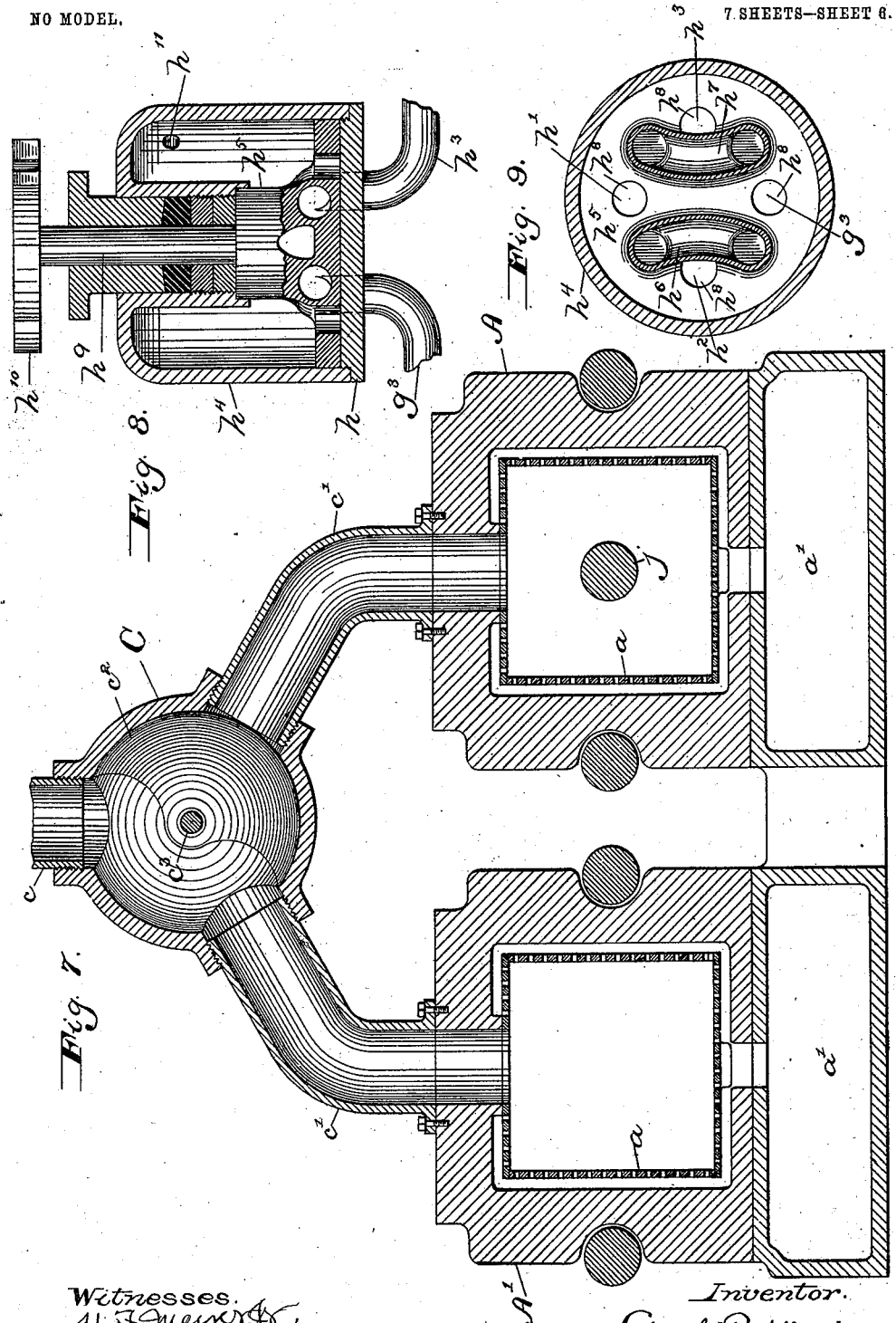
Witnesses.
Inventor.
Charles P. Minning
By Mann & Co.
Attorneys.

No. 723,702. PATENTED MAR. 24, 1903.
C. P. MINNING.
REGEALED ICE MACHINE.
APPLICATION FILED JULY 2, 1902.
NO MODEL. 7 SHEETS—SHEET 7.
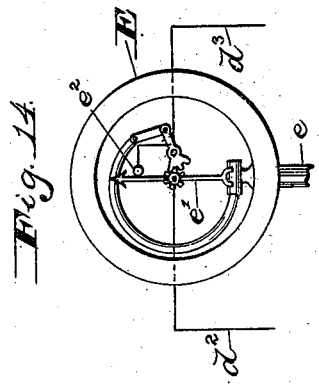
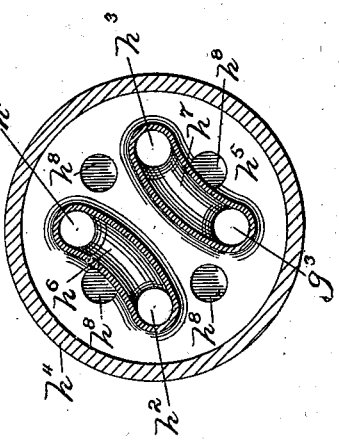
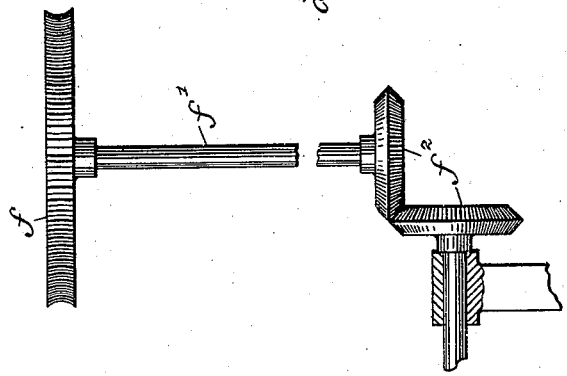
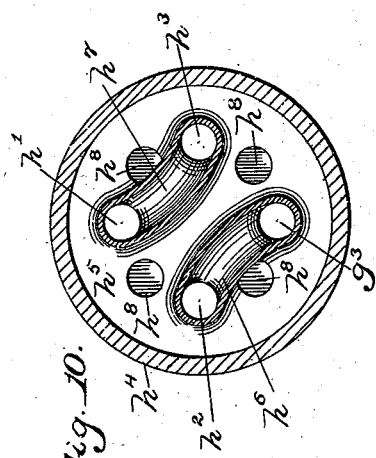
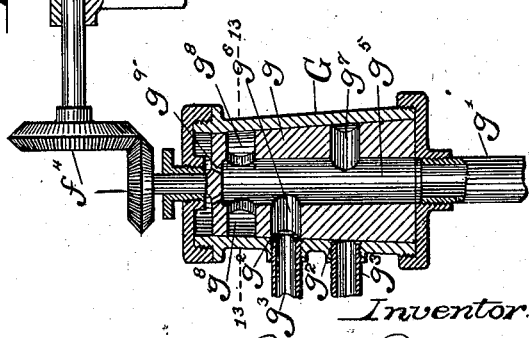
Witnesses.
H. F. Meyer
Frederick S. Stitt.
Inventor.
Charles P. Minning
By Mann & Co.
Attorneys
THE NORRIS PETERS CO., PHOTO-LITHO., WASHINGTON, D. C.

UNITED STATES PATENT OFFICE.

CHARLES P. MINNING, OF PHILADELPHIA, PENNSYLVANIA.

REGEALED-ICE MACHINE.

SPECIFICATION forming part of Letters Patent No. 723,702, dated March 24, 1903.

Application filed July 2, 1902. Serial No. 114,084. (No model.)

*To all whom it may concern:*

Be it known that I, CHARLES P. MINNING, a citizen of the United States, residing at Philadelphia, in the State of Pennsylvania, have invented certain new and useful Improvements in Regealed-Ice Machines, of which the following is a specification.

This invention relates to regealed-ice machines. In this class of machines the water is first formed into ice-slush, and it is customary to pump the slush from the freezing-tank into a slush-box, where it is compressed. The plunger of the slush-box is operated by means of a hydraulic cylinder. When the plunger has moved forward sufficiently to compress the slush, it is stopped, and the operation is to raise the gate of the slush-box and move the plunger to the completion of its forward stroke, which movement will eject the block of compressed ice from the slush-box, and the next step is to lower the gate, return the plunger to the end of its backward stroke, and finally again fill the slush-box preparatory to the repetition of the compressing and ejecting operation. Heretofore these operations have been effected by means of water-pressure controlled by valves and cocks actuated manually by one or more attendants, and the process being necessarily a complex one required skill and dexterity, as I have found by long experience, it taking less than three minutes to compress and eject a block of ice of commercial size, and in that short time the attendant has to make about seventeen distinct manual movements at different parts of a large machine. Consequently, as is evident, great difficulty has arisen in this class of ice-machines owing to the liability of the attendant to make mistakes. For instance, it has sometimes happened that the plunger was moved to eject the block of ice when the gate was about half-way raised and the gate would become twisted or bent, which necessitated repair and consequent delay, or the slush-feed pipe would become clogged with solid ice, which necessitated running hot water through the machine to thaw it out. Other difficulties have arisen which it is not deemed necessary to set forth here. I have in the preceding paragraphs set forth the operation of and difficulties associated with those manually-operated machines in order that those skilled in the art may more certainly comprehend the objects of my invention, hereinafter set forth, and of what said invention consists.

It is broadly the object of the present invention to overcome these difficulties by providing a regealing or slush-pressing machine which does away entirely with the "man element" and does its work entirely in an automatic manner without any manual attention other than watchful supervision.

More specifically, it is the object of the invention to provide a machine of this character which will continue its successive operations uninterruptedly in an automatic manner and in which the water-pressure to shut off the supply of slush from the slush-box to initially start, stop, and complete the forward-and-backward traverse of the hydraulic piston and plunger and to raise and lower the gate of the slush-box will be effected by automatic mechanism; and it is also the object of the invention to provide an improved machine of this character in which there are two slush-boxes, so arranged that one will be automatically filled while the slush in the other is being compressed, and vice versa.

Reference is to be had to the accompanying drawings, in which—

Figure 1 is a top plan view of the machine. Fig. 1ª is in the nature of a diagrammatic view, it being a top plan view of the machine with as much as may be dispensed with broken away to illustrate the arrangement of valve-actuating rods and levers. Fig. 2 is a side elevation of the machine. Fig. 2ª is an enlarged side elevation of one end of the machine as it would appear looking from a plane indicated by the line 2ª 2ª of Figs. 1 and 1ª. Fig. 3 is a side elevation of one of the hydraulic cylinders as it would appear looking from the plane indicated by the line 3 3 of Fig. 1. Fig. 4 is an end elevation of that part of the machine shown in Fig. 2ª. Figs. 5 and 6 are vertical transverse sectional views illustrating relief-valve mechanism. Fig. 7 is a vertical transverse sectional view taken on the line 7 7 of Fig. 1. Figs. 8, 9, 10, and 11 are detail sectional views of the valve mechanism which controls the operation of the hydraulic cylinders of the machine. Fig. 12 is a vertical sectional view of the water-supply-valve mechanism. Fig. 13 is a horizontal sectional view taken on the line 13 13 of Fig. 12. Fig. 14 is a view of the motor-starting pressure-gage.

For the sake of clearness I shall first describe the general structure and operation of the machine with special reference to Figs. 1 and 1$^a$ and then describe the various detail constructions and correlated operations of the parts.

The invention in the present instance comprises two slush boxes or tanks A A', arranged side by side and adapted to alternately receive the slush from a freezing-tank, (not shown,) and two hydraulic cylinders B B', also arranged side by side and each in longitudinal alinement with one of the slush-boxes. At that end of each slush-box which is farthest from the hydraulic cylinders is a gate, against which the slush in the box is compressed to form a solid block of ice by means of a plunger operated in the box by the piston of one of the hydraulic cylinders, said block being finished when the piston of the hydraulic cylinder is at a point about midway of its forward stroke, and as soon as the block is thus formed the said gate is opened and the piston, together with the plunger, is moved to complete the forward stroke, which movement ejects the newly-made block out of the slush-box. The gate is then again closed, the piston and plunger are moved to the end of their reverse stroke, and the slush-box is again filled with slush. The two slush-boxes and two hydraulic cylinders are so arranged that while one box is being filled the other is full and its slush is being compressed and ejected in the form of a solid block.

Referring now especially to Figs. 1, 2, and 7, the letter $c$ designates a main slush-pipe leading from the freezing-tank (not shown) and opening into a valve-casing C, from which two branch slush-pipes $c'$ lead, as best shown in Fig. 7, and open into the slush-boxes A A', respectively. Within said casing C is a valve $c^2$, mounted on an axis $c^3$ and adapted to establish communication between either one of the branch pipes $c'$ and the main pipe $c$, so that the slush may enter either one of the two slush-boxes A or A', where it is compressed within a foraminous shell $a$, the water which is squeezed out of the slush percolating into troughs $a'$ and returning thence to the freezing-tank. One end of the valve-axis $c^3$ projects outside of the casing C and is provided with a spur-wheel $c^4$, meshing with a worm $d$ on the shaft $d'$ of an electric motor D, whose terminals or binding-posts are in circuit with a pressure-gage E, connected to the main slush-pipe $c$ by means of a short pipe $e$, as illustrated in Figs. 1, 2, and 14. One of the circuit-wires $d^2$ of the motor is connected to the axis of the pointer or indicator $e'$ of the gage, and the other wire $d^3$ is connected to a pin $e^2$, with which the said pointer in its vertical position is intended to contact.

The slush is continually sucked by any suitable pump (not shown) from the freezing-tank through the main slush-pipe $c$ and enters one of the boxes A or A', and when the pressure in said pipe is increased until the pointer of the gage E has closed the motor-circuit by contact with the pin $e^2$ the motor will start and by means of the shaft $d'$, worm $d$, and spur-wheel $c^4$ will turn the valve to close off the supply of slush from one box and open the supply to the other box. The worm $d$ on the motor-shaft also meshes with a spur-gear $f$ on the upper end of a vertical shaft $f'$, as shown in Figs. 1, 2, and 12, and said shaft is connected at its lower end by means of bevel-gears $f^2$ with a horizontal shaft $f^3$, which latter is in turn connected by bevel-gears $f^4$ with the upwardly-projecting end of a valve-plug $g$, mounted to turn in a housing G. The said housing G is connected at its lower end to a main water-supply pipe $g'$, intended to be supplied with water from a continuously-operating pump, (not shown,) and said housing is also provided with two feed-ports $g^2$, one above the other, and to which feed-pipes $g^3$ are connected, one of said feed-pipes leading to the valve mechanism H of one hydraulic cylinder B and the other feed-pipe $g^3$ leading to a similar valve mechanism H of the other hydraulic cylinder B', as shown best in Figs. 1 and 2, and the said housing is further provided with a blow-over discharge-port and discharge-pipe $g^4$, as shown best in Figs. 2 and 13. The valve-plug $g$ is provided with a vertical passage $g^5$, communicating at all times with the supply-pipe $g'$, and is also provided with two diametrically opposite lateral feed-passages $g^6$ $g^7$, leading from said vertical passage and adapted to alternately register with one of the two feed-ports $g^2$, and the plug is also provided with two blow-over passages or by-passes $g^8$, adapted to establish communication between the supply-pipe $g'$ and the discharge-pipe $g^4$ whenever both of the lateral feed-passages $g^6$ $g^7$ are out of registry with the two feed-ports $g^2$, so that under those conditions the water from the continually-acting pump may flow freely through said valve without entering either of the feed-pipes $g^3$. Balance-ports $g^9$ are formed in the valve-plug $g'$, as shown in Fig. 12, whereby to prevent the said plug from being wedged too tightly in its housing.

Each of the two water-feed pipes $g^3$ leads to a valve mechanism to control the passage of water to and from either end of the hydraulic cylinder B or B', and for the illustration of said valve mechanism reference is to be had especially to Figs. 1 and 2 and 8 to 11, inclusive. There is one of these valve mechanisms for each hydraulic cylinder, and each comprises a base-plate $h$, provided with four ports, to each of which is connected a pipe, as shown best in Fig. 2. One of these pipes is the feed-pipe $g^3$, leading from the water-supply valve G. The diametrically opposite pipe $h'$ is the exhaust-pipe, and the other two diametrically opposite pipes $h^2$ $h^3$ lead to opposite ends of the cylinder, so that the water can act on the piston in the same. Secured to the base-plate $h$ is a dome $h^4$, within which is a valve $h^5$, mounted to turn on the surface of the base-plate and provided with two segmental passages $h^6$ $h^7$ and four blow-over ports $h^8$. When the said valve is in the position illustrated in Fig. 10, the one passage $h^6$ connects the feed-pipe $g^3$ with the pipe $h^2$, leading to the outer or far end of the hydraulic cylinder, and the other passage $h^7$ connects the inner or near end of the cylinder with the exhaust-pipe $h'$. In this position of the valve, as is manifest, the water is acting to push the piston in the forward direction. When the said valve $h^5$ is given a quarter-turn to the position illustrated in Fig. 11, the one passage $h^6$ then connects the outer or far end of the cylinder with the exhaust-pipe $h'$ and the other passage $h^7$ connects the feed-pipe $g^3$ with the other or inner end of the cylinder. In this position of the valve, as is manifest, the water is acting to push the piston in the backward or reverse direction. If the said valve should for any reason be stopped midway of these two positions, as illustrated in Fig. 9, two opposite blow-over ports $h^8$ will register with a feed-pipe $g^3$ and exhaust-pipe $h'$ and the other two blow-over ports register with the pipes leading to opposite ends of the cylinder. In this position of the valve the water forced continuously by the pump passes freely through the valve without affecting the cylinder-piston. As shown best in Fig. 1, the interior of the dome $h^4$ is connected to the feed-pipe $g^3$ by a pressure-balance pipe $h^{11}$. The stem $h^9$ of the valve $h^5$ projects out through a stuffing-box in the dome $h^4$ and is provided on its projecting end with a ratchet-wheel $h^{10}$, with which two push-pawls $i$ $i'$ coact. One of said push-pawls (that designated $i$) is connected to one end of a lever $i^2$, fulcrumed intermediate of its end, as at $i^4$, on the outermost head of the hydraulic cylinder, and carrying at its other end a pin $i^5$, extending through said head into the cylinder, so as to be struck and actuated by the piston J at the end of its reverse stroke. The other push-pawl $i'$ extends forwardly over the slush-box and is connected at its forward end to one arm of a bell-crank lever $i^6$, fulcrumed on top of the outer end of the slush-box and having its other arm connected by a link $i^7$ to one end of a lever $i^8$. The said lever $i^8$ is fulcrumed intermediate its ends on the lower head of a vertically-extending hydraulic gate-actuating cylinder O, to whose piston-rod $o$ is pivotally suspended a gate P, which is adapted to close the outer end of the slush-box and to rise in order to let the block of ice out. That end of the said lever $i^8$ opposite to the link $i^7$ carries a pin $i^9$, extending through the lowermost head of the cylinder into the latter and adapted to be struck and actuated by the piston of said cylinder, whereby to rock the lever $i^8$ and bell-crank lever $i^6$ in a direction to push the pawl $i'$ and cause the same to turn the ratchet-wheel $h^{10}$ and valve $h^5$.

The gate-actuating cylinder O is provided with a valve mechanism N similar to the valve mechanism H, hereinbefore described in connection with the compressing-cylinders B B′, and is provided with a feed-pipe $n'$, connected to the main feed-pipe $g^3$, an exhaust-pipe $n^2$, connected to the main exhaust-pipe $h'$, and two feed-pipes $n^3$ $n^4$, leading to opposite ends of the cylinder O. The valve of said mechanism is provided with a ratchet-wheel $n$, by which it may be turned to let water into either end of the said cylinder, and coacting with said ratchet-wheel is a pull-pawl $l$ and a push-pawl $m$, as best shown in Fig. 2$^{\mathrm{a}}$. The said pull-pawl $l$ extends downwardly from the said ratchet-wheel and is connected at its lower end to one arm of a bell-crank lever $l'$, fulcrumed on the slush-box, and having its other arm connected to one end of a link $l^2$, which extends rearwardly and is in turn connected at its other end to a lever $l^3$, fulcrumed on the innermost head of the cylinder B or B′, and carrying a pin $l^4$, extending through said head and adapted to be struck and actuated by the piston J upon the completion of its forward stroke.

The stem $j$ of the piston J works through one end of the slush-box and is provided inside of the box with a plunger, (not shown,) and, as before described, the piston moves forward—say one-half its stroke—to compress the slush, then stops while the gate P rises, and then completes its forward stroke to eject the block of ice. For the mechanism to momentarily stop the piston in its forward movement while the gate is being raised reference is to be had to Figs. 1 to 6, inclusive, and the following description.

From each one of the hydraulic cylinders B B′ and near the outer end thereof leads a pipe $q$, each of which is provided with a check-valve $q'$, opening outwardly from the cylinder, and each of said pipes opens into a relief-valve mechanism Q, which comprises a casing $q^2$, provided with a valve-seat $q^3$. A relief-valve $q^4$ is adapted to close on said valve-seat and is spring-pressed thereon with a tension equal to the water-pressure attained in the hydraulic cylinder when the slush has been sufficiently compressed. Within the casing $q^2$, above said valve $q^4$, is mounted a relief-piston $q^5$, whose stem $q^6$ projects through the top of the casing, and the said casing is provided near its top with an outlet $q^7$, connected to the exhaust-pipe $h'$. (See Fig. 1.) The projecting end of the piston-stem $q^6$ is connected to one arm of a bell-crank lever $r$, whose other arm is connected to a link-rod $r'$, connected in turn to one arm of a bell-crank lever $r^2$, fulcrumed on top of the outer end of the slush-box. The other arm of said bell-crank lever $r^2$ is connected to the push-pawl $m$.

As shown best in Fig. 6, a detent-lever $s$ is fulcrumed on the casing $q^2$ and carries at one end a detent-pin $s'$, spring-pressed toward the relief-valve $q^4$ and adapted to spring under said valve to hold it off its seat so soon as it is raised from the same. The other end of said lever $s$ is intended to be struck by one end of a rod $t$, which extends forwardly from said lever and is connected at its other or forward end to one arm of a bell-crank lever $t'$, whose other arm is connected by a link $t^2$ to a lever $t^3$, fulcrumed on the uppermost head of the gate-actuating cylinder O and carrying a pin $t^4$, extending through said head and adapted to be struck by the piston of said cylinder when the said piston completes its upward stroke. The operation of this relief-valve mechanism will be now described in its proper place relative to the operation of the other parts of the machine.

When sufficient slush has been pumped into one of the slush-boxes—say the box designated A'—the motor D is at once automatically started to turn the valve $c^2$, so as to cut off the supply of slush from that box and open the supply to the other box A. At the same time through the instrumentality of the train of gearing $d, f, f', f^2, f^3$, and $f^4$ (illustrated best in Fig. 12) the motor will turn the valve $g$ to open that feed-pipe $g^3$ which leads to the valve mechanism H for the hydraulic cylinder B'. It is to be understood that the piston J of said cylinder is at this time at the end of its reverse stroke, as illustrated in dotted lines, Fig. 1, and has, therefore, by means of the pin $i^5$ rocked the lever $i^2$ so that the latter has pushed the pawl $i$ against the ratchet-wheel $h^{10}$ to give the latter a one-quarter turn, far enough to bring the rotary valve $h^5$ into the position illustrated in Fig. 10—that is, a position where its passage $h^6$ connects the feed-pipe $g^3$ with the pipe $h^2$, leading to the outer or far end of the cylinder. Hence the water will get back of the piston J and move it and its plunger forwardly to compress the slush in the box A'. When the piston J has moved forward far enough to sufficiently compress the slush, the water-pressure back of the said piston is then sufficient to raise one of the relief-valves $q^4$, Fig. 5, off its seat against the tension of its spring, and the detent $s'$ will immediately spring under said valve and hold it off its seat, whereupon the water back of the piston J will act on the relief-piston $q^5$ and raise it past the outlet $q^7$, so that the pressure behind the piston J will be relieved and the forward movement of the said piston will be stopped for a short time. The upward movement of the relief-piston $q^5$ rocks the bell-crank lever $r$, which pulls the link-rod $r'$ and causes the said rod to rock the bell-crank lever $r^2$ in a direction to push the pawl $m$ to open the valve N and let water into the lower end of the cylinder O. Thereupon the piston of said cylinder will rise, drawing the gate P up with it. So soon as the said gate has been raised to uncover the outer end of the slush-box the rising piston will strike the pin $t^4$ in the upper head of the cylinder O and rock the lever $t^3$, which will in turn depress the link $t^2$ and through the instrumentality of the bell-crank lever $t'$ and rod $t$ will withdraw the detent-pin $s'$ from underneath the relief-valve and allow the said valve to seat, thereby closing the relief-pipe $q$ and causing the water which is still continuing to flow into the cylinder B to again act against the piston J, whereby to move the said piston and slush-box plunger to the completion of their forward stroke to eject the newly-made block of ice. When the piston J arrives near the end of its forward stroke, it strikes the pin $l^4$ in the innermost head of the cylinder B and rocks the lever $l^3$, which pulls on the link $l^2$, the said link thereby rocking the bell-crank lever $l'$ in a direction to pull the pawl $l$. When said pawl $l$ is thus pulled, it turns the valve N into position to shut off the flow of water from the lower end of the gate-actuating cylinder O and opens the flow of water to the upper end of said cylinder, so as to depress the piston to lower the gate, and the piston on its downward stroke strikes the pin $i^9$ and through the instrumentality of the lever $i^8$, link $i^7$, bell-crank lever $i^6$, and push-pawl $i'$ turns the valve $h^5$ to a position where it will let water into the innermost end of the cylinder B' to move the piston J in the reverse direction.

From the foregoing detailed description of the operation of the machine it will be seen that the piston J of one hydraulic cylinder B or B' first moves forward to compress the ice-slush in the slush-box, then stops for the moment while the gate is raised, then moves to complete its forward stroke, so as to eject the block of compressed slush or what is then solid ice. The gate then closes, and the piston J is moved to the limit of its reverse stroke and remains in that position while the respective slush-box is being again filled and while the other hydraulic cylinder is acting to compress the slush and eject the block of ice from the other slush-box.

Each of the levers $i^2, i^3, i^8$, and $l^3$ is provided with a spring $x$ to return it to its normal position—that is, a position where its pin projects into the cylinder so as to be struck by the piston working therein.

While the accompanying drawings and foregoing description disclose one form of the invention, it is obvious that various changes may be made in the construction, arrangement, and combination of parts without departing from the scope of the invention as set forth in the appended claims. It is also obvious that the automatic valve mechanism while primarily designed for regealed-ice machines may also be used with slight alterations in the arrangement of valves and levers in connection with other machinery for compressing fluids, gases, or solids—such as cotton-presses, air-compressors, and analogous machines—and it is understood that I am entitled to any use to which my invention can be put.

Having thus described my invention, what I claim as new, and desire to secure by Letters Patent, is—

1. In a machine of the character described, the combination of a slush-box provided with a gate; and means for automatically compressing the slush in said box, opening said gate, ejecting the compressed slush, and closing said gate, substantially as set forth.

2. In a machine of the character described, the combination of a slush-box; a fluid-pressure compressing-cylinder arranged to compress the slush in said box; a fluid-pressure supply for said cylinder; and a slush-feed for said box arranged to control said fluid-pressure supply, as set forth.

3. In a machine of the character described, the combination of a slush-box; a fluid-pressure compressing-cylinder arranged to compress the slush in said box; a fluid-pressure supply for said cylinder; a slush-feed for said box arranged to control said fluid-pressure supply; and means for automatically controlling the fluid-pressure supply to said cylinder whereby to compress the slush and eject the compressed slush, as set forth.

4. In a regealed-ice machine, the combination of a slush-box provided with a plunger and a gate; fluid-pressure mechanism adapted to actuate said plunger and open and shut said gate; and automatic means for controlling said fluid-pressure mechanism, as set forth.

5. In a regealed-ice machine, the combination of a slush-box provided with a slush-feed pipe, a gate, and a plunger; fluid-pressure cylinders adapted to actuate said plunger and open and shut said gate; and mechanism connecting said feed-pipe and hydraulic cylinders and arranged to automatically move said plunger a portion of its forward stroke, automatically open the gate and move the plunger to the completion of its forward stroke, and finally close the gate and reverse the movement of the plunger, as set forth.

6. In a regealed-ice machine, the combination of a slush-box provided with a plunger; a fluid-pressure cylinder whose piston is arranged to actuate said plunger; and automatic means for momentarily relieving the pressure back of said piston on its forward stroke whereby to stop the piston before the completion of said stroke.

7. In a regealed-ice machine, the combination of a slush-box provided with a plunger; a fluid-pressure cylinder whose piston is arranged to actuate said plunger; automatic means for momentarily relieving the pressure back of said piston on its forward stroke whereby to stop the piston before the completion of said stroke; and means for automatically continuing said forward stroke to its completion, as set forth.

8. In a regealed-ice machine, the combination of a slush-box provided with a plunger and gate; fluid-pressure mechanism provided with pistons arranged to actuate said plunger and said gate; means for automatically relieving the fluid-pressure back of the plunger-actuating piston on its forward stroke whereby to momentarily stop said piston and plunger, and said means arranged to automatically start the gate-actuating piston in a direction to open the gate; and means for automatically shutting off said relief when the gate has been opened whereby to complete the forward stroke of the plunger and its piston so as to eject the compressed slush.

9. In a regealed-ice machine, the combination of a slush-box provided with a plunger and gate; fluid-pressure mechanism provided with pistons arranged to actuate said plunger and said gate; means for automatically relieving the fluid-pressure back of the plunger-actuating piston on its forward stroke whereby to momentarily stop said piston and plunger, and said means arranged to automatically start the gate-actuating piston in a direction to open the gate; means for automatically shutting off said relief when the gate has been opened whereby to complete the forward stroke of the plunger and its piston so as to eject the compressed slush; and means for automatically reversing the direction of the gate-actuating piston when the plunger-actuating piston has completed its forward stroke, whereby to close said gate.

10. In a regealed-ice machine, the combination of a slush-box provided with a plunger and gate; fluid-pressure mechanism provided with pistons arranged to actuate said plunger and said gate; means for automatically relieving the fluid-pressure back of the plunger-actuating piston of its forward stroke whereby to momentarily stop said piston and plunger, and said means arranged to automatically start the gate-actuating piston in a direction to open the gate; means for automatically shutting off said relief when the gate has been opened whereby to complete the forward stroke of the plunger and its piston so as to eject the compressed slush; means for automatically reversing the direction of the gate-actuating piston when the plunger-actuating plunger has completed its forward stroke, whereby to close said gate; and means for automatically moving said plunger-actuating piston reversely when the gate has been lowered, as set forth.

11. In a regealed-ice machine, the combination of a slush-box provided with a feed-valve; fluid-pressure mechanism arranged to compress the slush in said box; and means whereby said feed-valve will automatically start said fluid-pressure mechanism.

12. In a regealed-ice machine, the combination of two slush-boxes provided with a common feed-pipe; a valve adapted to open said pipe alternately to both boxes; a fluid-pressure mechanism arranged to compress the slush in each box; and means for automatically shutting off said feed-pipe from one box when it is full and opening it to the other, as set forth.

13. In a regealed-ice machine, the combination of two slush-boxes provided with a common feed-pipe; a valve adapted to open said pipe alternately to both boxes; a fluid-pressure mechanism arranged to compress the slush in each box; means for automatically shutting off said feed-pipe from one box when it is full and opening it to the other; and means for automatically starting the fluid-pressure mechanism of that slush-box from which the feed is thus shut off, as set forth.

14. The combination of a box or tank provided with a plunger and a gate; fluid-pressure cylinders provided with pistons arranged to actuate said plunger and gate respectively; a valve mechanism for each of said cylinders; a pressure-relief mechanism adapted to stop the plunger-actuating piston before the completion of its forward stroke; and a lever mounted on each end of each cylinder and each lever provided with a pin extending through said end into the cylinder whereby it may be struck by the piston near the completion of its strokes, the lever on one end of the plunger-actuating cylinder being connected to said valve mechanism to operate the same in a direction to move its piston forwardly, the lever on the other end of said cylinder being connected to the valve mechanism for the gate-actuating cylinder and adapted to operate said mechanism to close the gate, and the said levers on the gate-actuating cylinder being connected, respectively, to the pressure-relief mechanism to shut off the pressure-relief, and to the valve mechanism of the plunger-actuating cylinder whereby to reverse the movement of the piston of said cylinder, as set forth.

15. The combination of a box or tank provided with a plunger and a gate; fluid-pressure cylinders provided with pistons arranged to actuate said plunger and gate respectively; a valve mechanism for each of said cylinders; a pressure-relief mechanism connected with the plunger-actuating cylinder, and including a relief-valve, a detent adapted to hold said valve open and a relief-piston adapted to be actuated by the fluid-pressure passing by said valve when open; a lever mounted on each end of each cylinder, and each lever provided with a pin extending through said end into the cylinder whereby it may be struck by the piston near the completion of its stroke, the lever on one end of the plunger-actuating cylinder being connected to the respective valve mechanism to operate the same in a direction to move its piston forwardly, the lever on the other end of said cylinder being connected to the valve mechanism for the gate-actuating cylinder and adapted to operate said mechanism to close the gate, and the said levers on the gate-actuating cylinder being connected respectively, to the said detent to shut off the pressure-relief, and to the valve mechanism of the plunger-actuating cylinder whereby to reverse the movement of the piston of said cylinder; and a connection between the said relief-piston and the valve mechanism of the gate-actuating cylinder, said connection being arranged to operate said mechanism to raise the gate.

16. In a machine of the character described, the combination of a box or tank provided with a plunger and gate; a fluid-pressure cylinder provided with a piston arranged to actuate said plunger; a relief-valve casing connected with said cylinder and provided with a valve-seat and an outlet; a valve adapted to close said seat and be raised therefrom by a certain amount of fluid-pressure; a detent adapted to hold said valve off its seat when it is raised therefrom; a piston in said casing and adapted to be moved past said outlet by the fluid admitted by said valve; means whereby the said movement of said piston will automatically open said gate; and means whereby when said gate is open the detent will be automatically withdrawn from said valve to allow the same to close, as set forth.

In testimony whereof I affix my signature in the presence of two witnesses.

CHARLES P. MINNING.

Witnesses:
A. C. GRAHAM,
R. K. BERKEMEYER.